July 22, 1952
A. F. HASBROOK
2,604,622
TEST DEVICE FOR DETERMINING TIME
DELAY IN PULSE REPEATERS
Filed March 30, 1949
2 SHEETS—SHEET 1
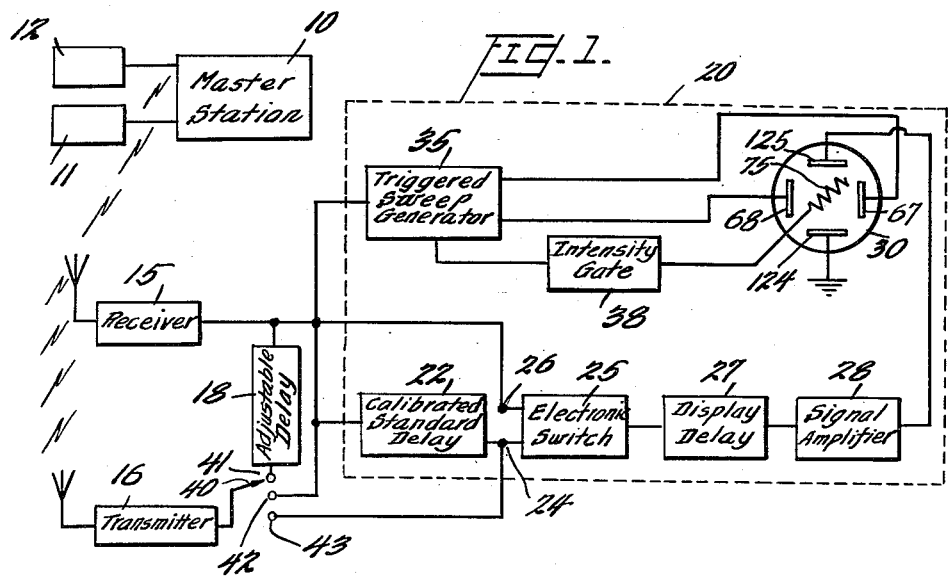
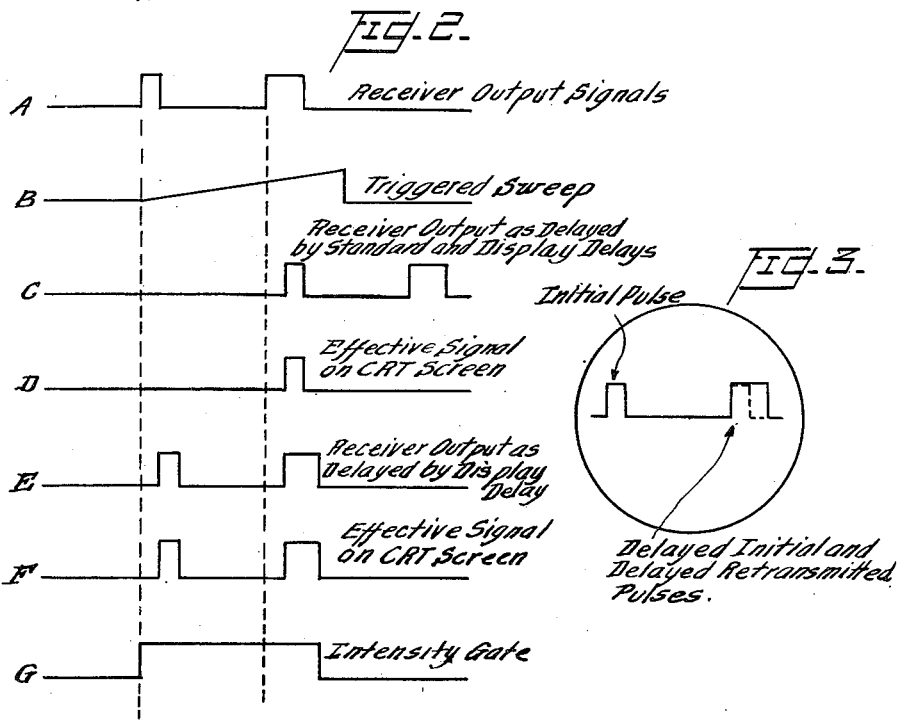
INVENTOR.
Arthur F. Hasbrook,
BY
Watson, Cole, Grindle + Watson
ATTORNEYS

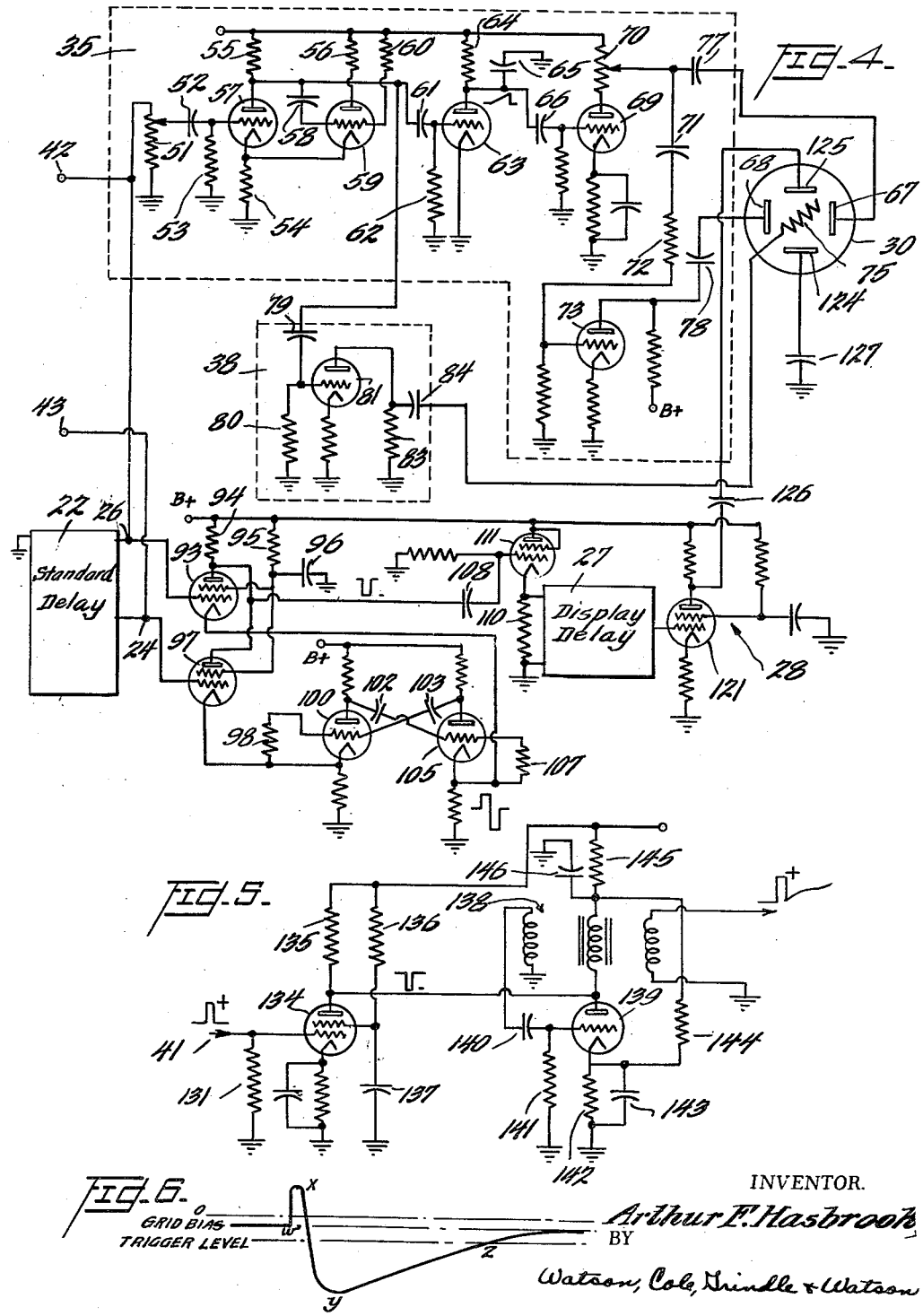

Patented July 22, 1952

2,604,622

UNITED STATES PATENT OFFICE 2,604,622

TEST DEVICE FOR DETERMINING TIME DELAY IN PULSE REPEATERS

Arthur F. Hasbrook, San Antonio, Tex., assignor to Olive S. Petty, San Antonio, Tex.

Application March 30, 1949, Serial No. 84,360

7 Claims. (Cl. 343—12)

This invention relates to improvements in apparatus for use in the electronic measurement of distances by transmission of radio pulses, and is more particularly concerned with the measurement and adjustment of the time delays inherent in certain apparatus employed in such systems.

It is a common expedient, in the measurement of distance by radio signaling, to transmit a timing signal from a master station to a distant repeater station at which the signal is received and again transmitted or reradiated for reception at the master station. The interval of time which elapses between the transmission of the initial signal from the master station and the arrival of the retransmitted signal thus is a measure of the distance between the two stations. For highest possible accuracy, it is necessary to determine and allow for the time delays inherent in certain circuit elements. Although proper design and arrangement may minimize or compensate for delays occurring at the master station, the time delay at the distant repeater station usually offers difficulty, especially since delay may there be deliberately introduced for the purpose of equalizing the total delay at each of several repeater stations.

It has heretofore been proposed to adjust or measure these delays by the use of complex circuit arrangements involving generation of accurate time bases, but these have not proved to be entirely satisfactory. It is therefore a primary purpose of the instant invention to provide relatively simple apparatus operating with a high degree of accuracy for the standardization and adjustment of time delays, and especially those occurring at a repeater station, in a system of the type described.

It is a further object to provide apparatus whereby the delay in the signal path at the repeater station may be accurately checked at the master station.

Further objects and features of the invention will be apparent from the following description taken in connection with the accompanying drawing, in which Figure 1 is a block diagram of a measuring system employing the principles of the invention;

Figure 2 is a series of curves illustrative of signals which may be produced at various points in the system shown in Figure 1;

Figure 3 represents a cathode ray screen showing a typical display obtained by the use of the system;

Figures 4 and 5 are diagrams of components employed in the system of Figure 1; and Figure 6 is a curve representing the signal energy developed at a point in the circuit shown in Figure 5.

While the invention is described with reference to the measurement of distance by radio transmission and with the use of conventional equipment as represented in the annexed drawings, it will be understood that such further uses of the inventive concept and various adaptations and modifications of the system elements are contemplated as would occur to those skilled in the art to which the invention relates.

Referring first to Figure 1 of the drawing, it will be observed that a master station 10 is provided with a transmitter 11 and a receiver 12. Various equipment components at the master station are conventional and the details thereof form no part of the instant invention. It will be understood, however, that in accordance with common practice in this field, a signal is radiated by the transmitter 11 at the master station 10 to one or more base or repeater stations, at each of which the signal is received and retransmitted to the receiver 12 at the master station. The signal has a recurring waveform of predetermined frequency, and is described herein for simplification as a pulsed signal. Suitable equipment is employed at the master station to measure the elapsed time between transmission and reception of the signal and thereby to determine the distance to the base station or stations.

Figure 1 also discloses diagrammatically certain of the various components which may be employed at each of the base or repeater stations, including a receiver 15 for the pulsed signals radiated by the master station 10, a transmitter 16 for radiating the received signal to the receiver 12 at the master station 10, and an adjustable delay device 18 through which signal energy is fed from the receiver 15 to the transmitter 16 at the repeater station.

In order to simplify the description of the apparatus at the base or repeater station, the transmitter 16 will be described as functioning to reradiate the signal received by the receiver 15, although it will be understood that the arrangement is the usual one in which the transmitter 16 is controlled by the output of receiver 15 to radiate a signal related to the received signal. It will also be understood that while the adjustable delay device 18, which may comprise any conventional delay network, multivibrator circuit, etc. is illustrated as a unit, it will be appreciated that any suitable adjustable delay means may be incorporated in and form a part of the transmitter, for certain purposes of the invention. The principal use of the adjustable delay device is to permit establishing a uniform period of delay in the over-all system, including the receiver and transmitter, at each of several base or repeater stations serving a common master station. The equipment thus far described is conventional and forms per se no part of the instant invention.

It will be appreciated that the over-all time delay should be kept constant in order to avoid the introduction of errors into the final time or distance indication, and in order to maintain the time delay at a known fixed value at the base station, I employ a delay synchronizer, the principal components of which are embraced in the dotted rectangle 20 of Figure 1 of the drawing, shown in more detail in Figure 4. Briefly described, the synchronizer affords a visual indication of two signals in superposed relation, both derived from the output of receiver 15, one signal being passed through a calibrated standard delay, and the other signal being passed through adjustable delay 18, transmitter 16, and receiver 15, so that the over-all delay in the receiver-transmitter system at the base station may be compared directly with a calibrated standard delay, and regulated whenever necessary by manipulation of adjustable delay device 18.

Thus part of the signal output from receiver 15 is fed through a calibrated standard delay 22 having a fixed delay value to terminal 24 of electronic switch diagrammatically represented at 25, and is also fed directly to terminal 26 of the switch. From this switch the selected signal is fed through a display delay 27, and a signal amplifier 28 and is then impressed across plates 124, 125 of a cathode ray tube 30. Electronic switch 25 may be replaced by any other conventional switching device operable sufficiently rapidly to ensure persistence of a visual image in tube 30 corresponding both to the directly transmitted signal and the delay signal after passage through the calibrated standard delay 22.

The output of receiver 15 is also fed through a triggered sweep generator 35 and impressed on plates 67, 68 of tube 30 to provide a suitable time base, the generator being of the conventional type providing a sawtooth output wave upon actuation by a trigger signal, such as the output signal from receiver 15. A conventional intensity gate 38, energized from generator 35, controls the potential on grid 75 of the tube so as to render the tube inoperative except during the arrival of wanted signal energy.

The mode of operation of the apparatus thus far described may be readily understood from an examination of Figure 2. Thus the invention contemplates that the signal energy radiated by transmitter 11, as well as that reradiated by transmitter 16, will be received and will appear in the output of receiver 15. This is illustrated in curve A of Figure 2, the first pulse being that received directly from the transmitter at the master station, and the second pulse being that reradiated to the master station but also received locally by the receiver 15. It will be appreciated that the spacing between the two pulses is caused by the delay occurring in adjustable delay device 18, transmitter 16, and receiver 15.

The first of the pulses shown at A triggers the sweep generator 35, the output of the generator being a sawtooth wave form essentially as shown at B. It will be appreciated that the duration, shape, and amplitude of the sweep waveform is determined by the characteristics of the generator 35. The output of the generator is applied to cathode ray tube 30 in the conventional manner to provide an acceptable time base or horizontal sweep.

Assuming first that electronic switch 25 is transmitting the signal applied at terminal 24, the waveform shown at A will be delayed in passage through calibrated delay 22 and display delay 27. The resulting delayed waveform is as shown at C, and since the second or retransmitted pulse now falls outside the sawtooth sweepwave shown at B, it will not be displayed on tube 30, the effective signal being that shown at D.

If it now be assumed that electronic switch 25 is transmitting the signal applied at terminal 26, the waveform shown at A will be delayed only by the display delay 27, and will appear as shown at E, both the original and the retransmitted pulses falling within the effective length of the sweep wave shown at B, so that both pulses are reproduced on the screen of tube 30 essentially as shown at F.

In order to avoid over-illumination of the trailing end of the trace appearing on tube 30, the sweep wave may also be applied through intensity gate 38 to bias the control grid 75 of tube 30, whereby the electron beam is reduced in intensity at the end of the sweep.

In Figure 3 is shown a typical display on the screen of the cathode ray tube 30, the trace showing in superposed relation the two pulses represented at F in Figure 2 and the single pulse represented at D in Figure 2, the latter being shown in dotted line for clarity. As represented in Figure 3, the initial pulse, delayed by passage through the standard delay, is shown substantially in coincidence with the second or retransmitted pulse which has not been delayed. Should variation in circuit characteristics occur, so that the delayed pulse no longer coincides with the retransmitted undelayed pulse, then by manipulation of adjustable delay 18 the required coincidence can be re-established. In this manner the total delay at the base station may always be kept constant by comparison with the calibrated standard delay 22 as described.

In order that the calibrated delay 22 may be checked occasionally in order to ensure full accuracy, a selector switch 40 may be provided, the switch 40 having three contacts 41, 42, and 43. In normal operation of the system, contact 41 is selected, but by selection of contact 42, adjustable delay 18 may be eliminated from the circuit, and by selection of contact 43 the signal is caused to pass through the calibrated delay 22 before reradiation to the master station. Thus for purposes of testing the value of the calibrated delay, selector switch 40 may be manipulated to select in succession contact 42 and contact 43. The additional delay in signal transmission which occurs on selection of contact 43 is thus representative of the time value of calibrated delay 22, and this may be checked at the master station 10 for the purpose of standardizing the calibrated delay devices at each of the several base stations.

The circuits thus far described are illustrated in more detail in Figures 4 and 5, similar reference characters being used to denote the various units of the apparatus represented diagrammatically in Figure 1.

Referring first to the triggered sweep generator 35, it will be observed that signal energy from the output of base station receiver 15, which is supplied to contact 42 of switch 40 as described, is fed to amplitude control 51 and thence through capacitor 52 to the cathode coupled multivibrator comprising tubes 57 and 59, plate load resistors 55 and 56, grid resistors 53 and 60, and coupling capacitor 58. On being triggered by a signal pulse, multivibrator action occurs, and the plate of tube 57 becomes highly negative for the duration of the pulse. The negative pulse thus generated is applied through capacitor 61 to the grid of tube 63 which, together with the associated elements 62, 64 and 65 constitutes a sweep generator circuit. Thus in the quiescent state, tube 63 draws considerable plate current, and the potential at the plate is relatively low because of the drop in plate load resistor 64. When the grid of tube 63 becomes highly negative on arrival of the trigger pulse, current flow ceases, and timing capacitor 65 is charged by plate load resistor 64, to produce the sweep or sawtooth waveform. This sweep signal is then applied through capacitor 66 to amplifier tube 69, the output being applied to plate load resistor 70 and through capacitor 71 to one horizontal plate 67 of cathode ray tube 30. To eliminate distortion, the output of tube 69 is also fed through capacitor 71 and resistor 72 to a phase inverting tube 73, the gain of which is reduced to unity by appropriate selection of values of capacitor 71 and resistor 72. The output of tube 73 is supplied through capacitor 78 to the other of the horizontal plates of tube 30, indicated at 68. It will be understood that positioning circuits and other apparatus commonly associated with cathode ray tubes are included, but are not illustrated in order to avoid undue complexity.

In order to blank out the flyback trace on the cathode-ray tube 30, which might otherwise interfere with observed signals, the grid 75 of the tube is normally biased so as to prevent passage of the electron stream. During the signal period an intensity gate circuit 38 is provided so as to overcome this normal bias and permit illumination of the screen. Tube 81 with associated grid resistor 80, and plate load resistor 83 comprise an "intensity gating circuit." Normally tube 81 is underbiased so as to draw considerable plate current, but when negative trigger is applied via capacitor 79 to the grid of tube 81, plate current is cut off and a positive voltage pulse occurs at the plate. This voltage pulse is applied through capacitor 84 to the grid 75 of the cathode-ray tube 30, so as to overcome the normal bias and permit illumination of the screen. By suitable choice of the values of capacitor 79 and resistor 80, the pulse duration may be adjusted to provide gating only during the time of the sweep, as illustrated in Figure 2, at G.

It is essential to note that the pulse duration at the plate of tube 57 may be quite long compared with the length of the final sweep waveform. Tube 63 and its associated timing elements determine this sweep wave time, and the pulse from tube 57 merely initiates the waveform. During the period of negative pulse at the plate of tube 57, the grid of that tube is well above cut-off potential and unresponsive to additional signals which may be applied through capacitor 52. Thus the triggered sweep generator 35 is unresponsive to trigger pulses which occur during the period immediately following the main trigger pulse, because the cathode-coupled multivibrator is already in the triggered state.

As hereinbefore explained, the displayed signal is transmitted to the cathode ray tube from the output of receiver 15 through two electrical paths in sequence by means of a switching device 25, the calibrated standard delay 22 being interposed in one only of these paths. Switching device 25 thus serves to supply the cathode ray tube alternately with delayed and undelayed signals, the rate of alternation being sufficiently high to afford optical continuity of the two traces.

Certain of the components of the signal circuit are illustrated in more detail in the lower portion of Figure 4. Thus the signal from the output of base station receiver 15, which is supplied to contact 42 of switch 40 as described, is applied directly to the control grid of tube 93; the same signal, after passage through the calibrated delay 22 as supplied to contact 43 is applied to control grid of tube 97. Tubes 93 and 97 have a common plate load resistor 94, screen resistor 95, and screen by-pass capacitor 96. The cathodes of the two tubes are independently connected to the electronic switch circuit comprising tubes 100 and 105, the elements of the switch circuit being conventional.

The electronic switch is essentially a free-running multivibrator, the period of which is determined primarily by the values of coupling capacitors 102, 103 and grid resistors 98 and 107. It will be appreciated that the multivibrator action alternately changes the cathode potential of tubes 93 and 97, whereby the latter are alternately permitted to pass the signal. The output of these tubes is fed through capacitor 108 to tube 111, this tube and its associated elements comprising a cathode follower. The output of tube 111 is applied across cathode resistor 110, so as to furnish a low impedance source for display delay 27, which functions to insure display of signals near the middle of the sweep time to facilitate study. From display delay 27 the signal is fed through amplifier 28, comprising tube 121 and associated elements, and thence through capacitor 126 to the vertical deflection plate 125 of cathode-ray tube 30. The coacting vertical deflection plate 124 is grounded through capacitor 127, positioning controls being omitted in the interests of clarity.

It will be appreciated that the reradiation of pulses which have once been reradiated by transmitter 16 and again received in receiver 15 is undesirable. Arrangements are therefore made whereby the transmitter 16 is rendered unresponsive to the reradiated signal, one such arrangement being illustrated in Figure 5. Thus the energy fed to transmitter 16 through adjustable delay 18 from contact 41 may be applied to a pulse amplifier tube 134, having associated therewith grid resistor 131, plate load resistor 135, screen resistor 136 and screen by-pass capacitor 137. The negative output pulse from tube 134 is applied to the plate of tube 139, which with oscillation transformer 138, grid capacitor 140, grid resistor 141, voltage divider resistors 142 and 144, decoupling resistor 145 and decoupling capacitor 146 constitutes a single cycle blocking oscillator. In the quiescent state, plate current in tube 139 is held to cut-off by the positive bias applied to the cathode of the tube through voltage divider resistors 142 and 144. When a negative trigger pulse is applied to the plate of tube 139, oscillation occurs which terminates at the end of a single cycle because of excessive negative bias developed on the grid of the tube. The circuit of Figure 5 may be formed as part of the transmitter 16, the circuit output being supplied to the pulse modulator of the transmitter in the conventional manner.

In Figure 6 is shown the typical waveform at the grid of blocking oscillator tube 139. As blocking oscillator action occurs, the grid voltage rises to a positive peak X, falls rapidly to a strongly negative peak Y, and slowly recovers to point Z. During the period represented by Y—Z the circuit is unresponsive to input trigger pulses. By varying the values of capacitor 140 and resistor 141, and to some extent resistor 142 and capacitor 143, the recovery time Y—Z can be varied over a wide range. In the operation of the system herein described, the constants are so selected that this recovery time is almost as long as the interval between pulses transmitted from the master station 10. Thus the initial pulse from the output of receiver 15 is passed through the circuit shown in Figure 6 and reradiated by transmitter 16. The reradiated pulse, after reception in receiver 15, is blocked by this circuit and is not again radiated. It will be perceived that by the application of the principles set forth herein, accurate adjustment of the over-all delay at each base station may readily be effected, to the end that the delay may be uniform at the several base stations.

In the application of the instant invention to a signaling system employing sine wave modulation, for instance as described and claimed in my co-pending application, Serial No. 84,359 filed concurrently herewith, the modulating wave may be shaped into pulses before application to the delay synchronizer 20 of the instant system. Furthermore, since the use of continuous wave systems does not normally permit transmission and reception on the same frequency, a second receiver at the base station, tuned to the output of transmitter 16, would be required. Since receivers offer little delay and virtually no variations in delay, the use of two receivers offers no serious problem.

Having thus described the invention, what is claimed as new and desired to be secured by Letters Patent is:

1. In electronic distance measuring systems having a master station transmitting a recurrent waveform signal, and a base station receiving said signal and reradiating a conforming signal to said master station, said system having at said base station a receiver, a transmitter reradiating signal energy derived from the receiver output, and an adjustable delay device associated with said base station receiver and transmitter for delaying the reradiation of said signal to a controlled extent, said base station receiver receiving initial signals transmitted from said master station and signals reradiated from said base station transmitter, the combination at said base station with a signal display device, of two electrical paths for conducting signal energy from said base station receiver to said display device, a calibrated delay device interposed in one only of said paths, and a switching device operable to pass alternately through said paths both the initial and the reradiated signals, whereby the extent of delay in said calibrated delay device and in said base station transmitter, receiver, and adjustable delay device may be compared, and means blocking the radiation by said transmitter of reradiated signal energy received by said base station receiver.

2. In electronic distance measuring systems having a master station transmitting a recurrent waveform signal, and a base station receiving said signal and reradiating a conforming signal to said master station, said system having at said base station a receiver, a transmitter reradiating signal energy derived from the receiver output, and an adjustable delay device associated with said base station receiver and transmitter for delaying the reradiation of said signal to a controlled extent, said base station receiver receiving initial signals transmitted from said master station and signals reradiated from said base station transmitter, the combination at said base station with a signal display device, of two electrical paths for conducting signal energy from said base station receiver to said display device, a calibrated delay device interposed in one only of said paths, and a switching device operable to pass alternately through said paths both the initial and the reradiated signals, whereby the extent of delay in said calibrated delay device and in said base station transmitter, receiver, and adjustable delay device may be compared, and a sweep generator delivering to said display device sweep signals having a duration not substantially greater than the total delay period in said base station receiver, adjustable delay device, and transmitter, whereby reradiated signals passed through said calibrated delay device are not displayed.

3. In electronic distance measuring systems having a master station transmitting a recurrent waveform signal, and a base station receiving said signal and reradiating a conforming signal to said master station, said system having at said base station a receiver, a transmitter reradiating signal energy derived from the receiver output, and an adjustable delay device associated with said base station receiver and transmitter for delaying the reradiation of said signal to a controlled extent, said base station receiver receiving initial signals transmitted from said master station and signals reradiated from said base station transmitter, the combination at said base station with a signal display device, of two electrical paths for conducting signal energy from said base station receiver to said display device, a calibrated delay device interposed in one only of said paths, and a switching device operable to pass alternately through said paths both the initial and the reradiated signals, whereby the extent of delay in said calibrated delay device and in said base station transmitter, receiver, and adjustable delay device may be compared, and a switch selectively operable to connect said transmitter with the output of said receiver either through said adjustable delay, through said standard delay, or directly, whereby the value of either of said delays may be checked at said master station by comparing the delayed and undelayed signals.

4. In electronic distance measuring systems having a master station transmitting a recurrent waveform signal, and a base station receiving said signal and reradiating a conforming signal to said master station, said system having at said base station a receiver, a transmitter reradiating signal energy derived from the receiver output, and an adjustable delay device associated with said base station receiver and transmitter for delaying the reradiation of said signal to a controlled extent, said receiver being tuned to receive signals transmitted from said master station and signals reradiated from said base station transmitter, the combination with a calibrated delay device at said base station, of signal display means, and means energizing said signal display means from the output of said base station receiver, said last named means including a switching device passing through said calibrated delay device signal energy received from said master station, and passing directly signal energy reradiated by said base station transmitter, whereby the extent of delay in said calibrated delay device and the delay in said base station transmitter, receiver, and adjustable delay device may be compared.

5. In pulse measuring apparatus, the combination with a cathode ray oscillograph and means for effecting sweep deflection of the ray, of a receiver for receiving a radiated pulsed signal from a remote source, a transmitter for reradiating the signal output of said receiver, and means including an adjustable delay network for feeding the signal output of the receiver to the transmitter, said receiver being tuned to receive both the initially radiated signal from the remote station and the delayed reradiated signal from said transmitter, a circuit for impressing impulses corresponding to the pulses of said initial and reradiated signals on said oscillograph to produce a composite trace thereon, a standard delay network, switching means periodically including said standard delay network in said last named circuit to superimpose on said composite trace a second and delayed trace, whereby the displacement between the pulse of the reradiated signal of the composite trace and the pulse of the initial signal on the superimposed trace is a measure of the relative delay in the receiver, transmitter, and adjustable delay network as compared with the standard delay network.

6. In pulse measuring apparatus, the combination with a cathode ray oscillograph and means for effecting sweep deflection of the ray, of a receiver for receiving a radiated pulsed signal from a remote source, a transmitter for reradiating the signal output of said receiver to said remote source and to the receiver, and means including an adjustable delay network for feeding the signal output of the receiver to the transmitter, means blocking reradiation by said transmitter of signals once reradiated by said transmitter, a circuit supplied by the receiver output for impressing impulses corresponding to the pulses of said initial and reradiated signals on said oscillograph to produce a composite trace thereon, a standard delay network, switching means periodically including said standard delay network in said last named circuit to superimpose on said composite trace a second and delayed trace, whereby the displacement between the pulse of the reradiated signal of the composite trace and the pulse of the initial signal on the superimposed trace is a measure of the relative delay in the receiver, transmitter, and adjustable delay network as compared with the standard delay network.

7. In pulse measuring apparatus, the combination with a cathode ray oscillograph and means for effecting sweep deflection of the ray, of a receiver for receiving a radiated pulsed signal from a remote source, a transmitter for reradiating the signal output of said receiver to said remote source and to the receiver, and means including an adjustable delay network for feeding the signal output of the receiver to the transmitter, means blocking reradiation by said transmitter of signals once reradiated by said transmitter, a circuit supplied by the receiver output for impressing impulses corresponding to the pulses of said initial and reradiated signals on said oscillograph to produce a composite trace thereon, a standard delay network, switching means periodically including said standard delay network in said last named circuit to superimpose on said composite trace a second and delayed trace, whereby the displacement between the pulse of the reradiated signal of the composite trace and the pulse of the initial signal on the superimposed trace is a measure of the relative delay in the receiver, transmitter, and adjustable delay network as compared with the standard delay network, said oscillograph including a sweep generator energized from the receiver output and delivering a sweep signal of duration less than that required to display reradiated signals passing through said standard delay network.

ARTHUR F. HASBROOK.

REFERENCES CITED

The following references are of record in the file of this patent:

UNITED STATES PATENTS

| Number | Name | Date |
|---|---|---|
| 1,750,668 | Green | Mar. 18, 1930 |
| 2,198,113 | Holmes | Apr. 23, 1940 |
| 2,248,727 | Stroebel | July 8, 1941 |
| 2,252,083 | Luck | Aug. 12, 1941 |
| 2,421,016 | Deloraine et al. | May 27, 1947 |
| 2,453,970 | Charrier | Nov. 16, 1948 |
| 2,470,787 | Nosker | May 24, 1949 |
| 2,531,412 | Deloraine | Nov. 28, 1950 |